United States Patent [19]
Kanbar

[11] Patent Number: 5,151,720
[45] Date of Patent: Sep. 29, 1992

[54] CONVERTIBLE SWIZZLE STICK

[76] Inventor: Maurice S. Kanbar, 4 E. 77th St., New York, N.Y. 10021

[21] Appl. No.: 600,596

[22] Filed: Oct. 19, 1990

[51] Int. Cl.⁵ .............................................. G02C 7/16
[52] U.S. Cl. ....................................... 351/46; 351/56; D7/300.2
[58] Field of Search ................... 351/41, 45, 46, 56; D7/300.2

[56] References Cited
U.S. PATENT DOCUMENTS

| | | | |
|---|---|---|---|
| D 206,910 | 2/1967 | Lueddeke | 351/56 |
| 3,876,294 | 4/1975 | Kanbar et al. | 351/46 |

*Primary Examiner*—Paul M. Dzierzynski
*Attorney, Agent, or Firm*—Michael Ebert

[57] ABSTRACT

A swizzle stick for stirring mixed drinks, the stick being convertible to a lensless ophthalmic device, making it possible for a typical individual having defective sight to see clearly regardless of the nature of the defect. The swizzle stick includes a strip section having a profile defining a pair of eyepieces joined to a nose piece and a handle extending from one of the eye pieces. Extending from the other eyepiece is a swizzle shank, the junction therebelow being scored so that the shank may be broken off to convert the stick to an ophthalmic device. Each eyepiece has a pattern of pin holes therein adapted to project a clear image of the object viewed by the related eye of the user of the device.

7 Claims, 1 Drawing Sheet

CONVERTIBLE SWIZZLE STICK

BACKGROUND OF INVENTION

1. Field of Invention

This invention relates generally to swizzle sticks for stirring mixed drinks, and more particularly to a stick which is convertible into a lensless ophthalmic device.

2. Status of Prior Art

A conventional swizzle stick is formed by a thin rod, usually of synthetic plastic material which is adapted to stir mixed drinks or cocktails, such as a Bloody Mary or a Cuba Libre. While in some instances the ingredients of the mixture may be pre-mixed before being poured into a glass containing ice cubes, then in order to rapidly cool the drink, the mixture and the ice cubes are stirred in the glass. Hence when a customer in a bar or restaurant orders a mixed drink, he is usually supplied with a swizzle stick.

In a restaurant, imbibing a mixed drink or cocktail is often a prelude to dining. Thus while the customer sips his drink he may at the same time be consulting a menu. Many customers cannot read a menu without the aid of spectacles specifically designed to correct the eye defects of the wearer. But those who dine in fashionable restaurants often do not as a matter of personal vanity bring along a pair of spectacles, for wearing spectacles is regarded as unglamorous. This presents a problem; for while a customer whose eyes require correction has no need for eyeglasses while dining, he may be unable without these glasses to consult the menu.

In my prior U.S. Pat. No. (3,876,294 - Kanbar), I disclose a lensless ophthalmic device serving as a temporary or emergency substitute for any type of prescription eyeglasses, making it possible for most individuals having defective sight, without regard to the optical nature of the defect, to see clearly. The device is constituted by a molded plate having a profile defining a pair of eyepieces joined to a nose piece, each eyepiece having a pattern of pin holes therein adapted to project a clear image of the object viewed on the related eye of the wearer. The spacings between holes in the pattern is such that when the plate is placed against the eyes, the eye is unable to resolve the hole pattern and the holes in each eyepiece appear to merge to form one large opening.

SUMMARY OF INVENTION

The main object of this invention is to provide a swizzle stick that is convertible into an ophthalmic device so that the user, after having stirred his mixed drink with the swizzle stick, can then transform the stick into a device which makes it possible for a user having defective sight to see clearly regardless of the nature of the defect.

More particularly, it is an object of this invention to provide an inexpensive, single piece, convertible swizzle stick of the above type molded of synthetic plastic material.

Also an object of the invention is to provide a stick of the above type in which the handle for the ophthalmic device takes the form of a small sign board on which advertising material may be printed to promote the sale of a particular liquor or other product.

A significant advantage of the invention is that when the stick has been transformed, the resultant ophthalmic device may be retained by the user as a substitute for prescription eyeglasses to be used when these eyeglasses have been lost or are not available.

Briefly stated, these objects are attained in a swizzle stick for stirring mixed drinks, the stick being convertible to a lensless ophthalmic device, making it possible for a typical individual having defective sight to see clearly regardless of the nature of the defect. The swizzle stick includes a strip section having a profile defining a pair of eyepieces joined to a nose piece and a handle extending from one of the eye pieces. Extending from the other eyepiece is a swizzle shank, the junction therebelow being scored or otherwise weakened so that the shank may be broken off to convert the stick to an ophthalmic device. Each eyepiece has a pattern of pin holes therein adapted to project a clear image of the object viewed by the related eye of the user of the device.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 2:
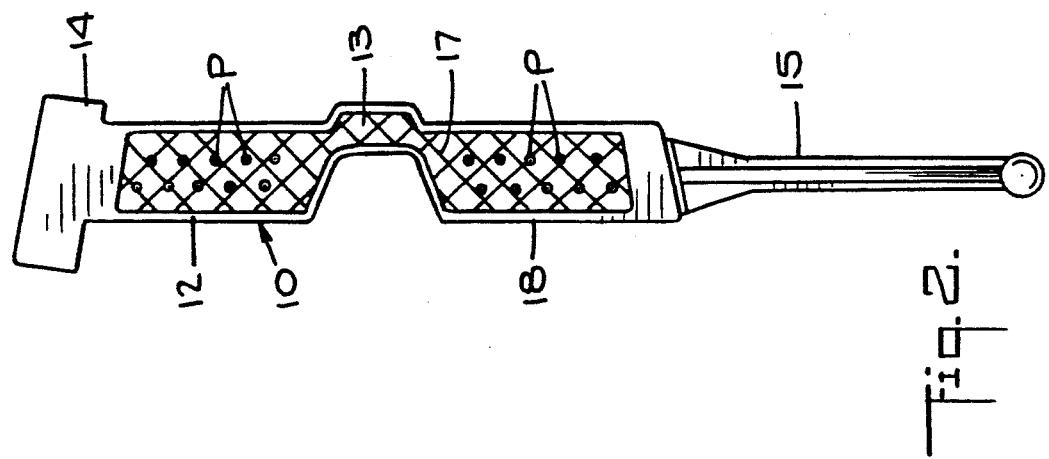
FIG. 2 is a rear view thereof.
Figure 1:
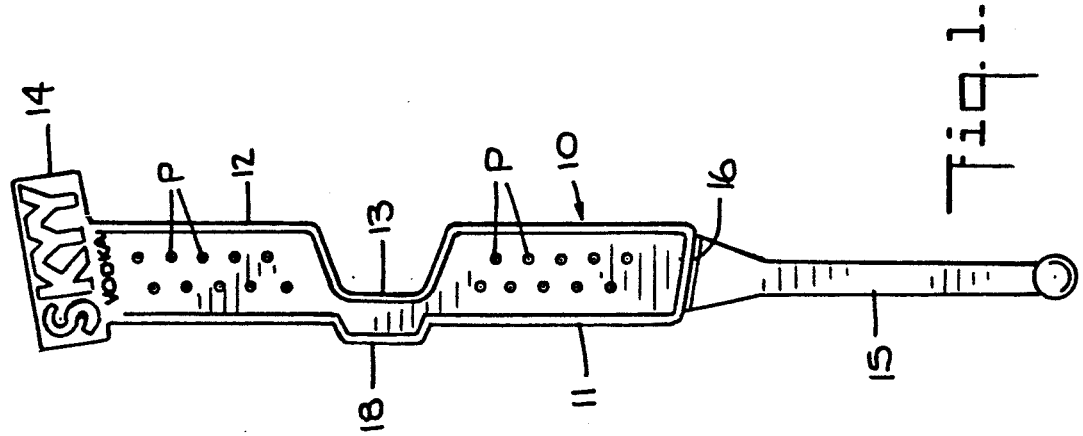
FIG. 1 is a front view of a convertible swizzle stick in accordance with the invention.

Referring now to FIGS. 1 and 2, there is shown a convertible swizzle stick in accordance with the invention, the stick being of one-piece construction and being molded of high-strength plastic material such as polypropylene or high impact nylon. The stick includes a generally rectangular strip section 10 that is profiled to define a pair of eyepieces 11 and 12 joined to a nose piece 13 adapted to fit over the nose of a wearer. Extending from eyepiece 12 is a small rectangular plate 14 functioning as a handle and also as a sign board on which can be printed advertising material, such as SKYY Vodka. The sign board is angled somewhat with respect to the body of the strip. Extending from eyepiece 11 is a swizzle stick shank 15 having a round tip. In practice, however, the tip may be pointed to serve as a pick so that the stick can be used to pierce cherries or other pieces of fruit in the drink.

The junction of eyepiece 11 and shank 15 is transversely scored by a score line 16 or otherwise weakened, thereby making it possible to break off the shank and convert the stick into an ophthalmic device.

Eyepieces 11 and 12 are each provided with a pattern of pin holes P. To rigidify the strip, the rear thereof, as shown in FIG. 2, is provided with criss-cross ribs 17. And the periphery of the strip is provided with a continuous ridge 18 for the same purpose. The pattern of pin holes P on each eyepiece is created by two parallel rows of equi-spaced pin holes, the holes of one row being staggered relative to those of the other row. The pinhole pattern may be in other forms such as those shown in the Kanbar patent.

The diameter of each pin hole is in the order of a few thousandths of an inch to afford a camera-obscura effect. Ordinarily, the naked eye acts as an adjustable lens to focus an image of the near or distant object onto the retina, the eye lens adjusting itself to the distance between the object and the eye. If the eye is defective, its lens is incapable of properly focusing a well-defined image on the retina. Hence the purpose of a conventional eyeglass lens is to act in combination with the eye lens in a manner compensating for or correcting the eye lens defect, whereby a well-defined image is produced on the retina.

When instead of a corrective lens, a pin hole is placed very close to the eye, all rays emerging from the object being viewed must meet and pass through the minute hole; hence the pin hole acts as a point of focus. Because this focusing point on the plate is very close to the eye, the eye lens cannot act to focus on the object being viewed, but passes the image focused by the pin hole onto the retina.

Thus, what the retina senses is not the poorly focused image produced by the eye lens (assuming defective vision), but the better focused image produced by the pin hole. This optical effect is made evident if one moves the pin hole away from the eye; for while one can still see through the hole, the eye is then able to function normally, and if its lens is defective, the image seen through the pin hole is only that which the eye is capable of seeing without correction.

But the moment the pin hole is brought directly adjacent the eye, the image is brought into focus, for the pin hole is situated between the focal point of the eye lens and the eye itself. In other words, the focal point of the eye lens is behind the opaque strip 10 and is blocked thereby so that the eye directly in front of the plate sees only the rays focused thereon by the pin hole.

Because a single pin hole admits relatively little light, in order to produce an adequately bright image, a pattern of holes is employed, with sufficient spacing therebetween so that each hole still functions independently as a focusing element.

When the device is worn, the pin holes are close to the eyes, hence the eyes are unable to resolve these holes and instead of seeing separated holes as in the pattern formation shown in FIGS. 1 and 2, the spacing between holes is such that the several holes appear to fuse or merge. While the effect is grid-like, the connecting webs of the grid are thin, whereas the pin holes are enlarged and close together. Consequently, the pattern of pin holes, when close to the eye, is more like a multiple-paned window which does not obstruct vision.

Figure 3:
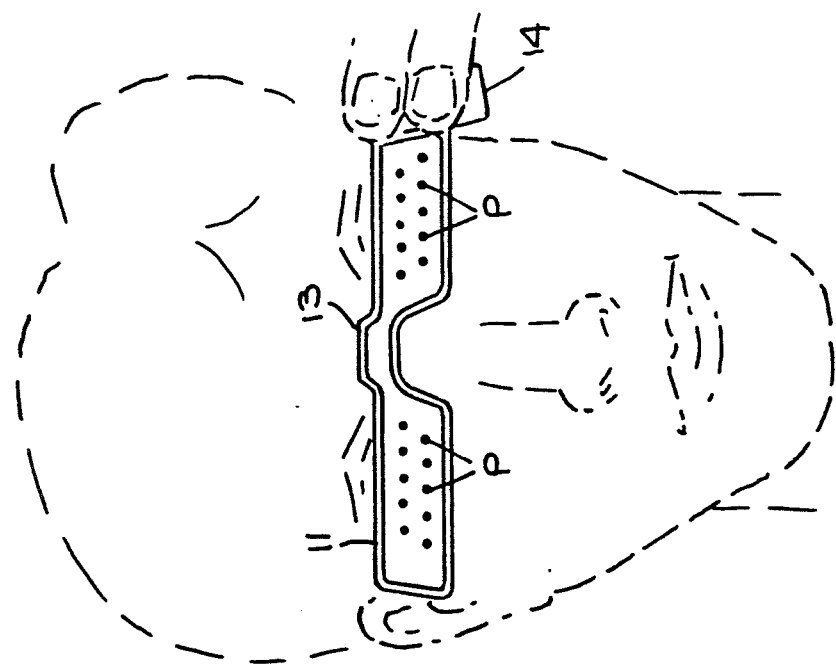
FIG. 3 shows the transformed swizzle stick used as an ophthalmic device.

When the swizzle stick is used to stir a drink, then strip 10 functions only as a handle for the swizzle shank 15. But when the user wishes to use the stick as a lensless ophthalmic device to read a menu or for any other purpose that ordinarily requires prescription spectacles, he breaks off shank 15, thereby transforming the stick into an ophthalmic device in a lorgnette format in which handle 14 functions as the lognette handle, as shown in FIG. 3, with the eyepieces placed in front of the eyes the user.

Thus the convertible swizzle stick has two distinct functions, for it can be used to stir drinks and thereafter transformed into an optical device for those users having defective sight.

While there has been shown and described a preferred embodiment of a convertible swizzle stick in accordance with the invention, it will be appreciated that many objects and modifications may be made therein without, however, departing from the essential spirit thereof.

I claim:

1. A swizzle stick which is convertible into a lensless ophthalmic device comprising:
   (a) a generally flat rectangular elongated strip section having a nose piece notch at its midsection to define a pair of like rectangular eyepieces joined to a nose piece, and a short lorgnette handle extending from one of the eyepieces, said eyepieces each having a pattern of pin holes adapted to project a clear image of an object being viewed by a related eye of a user; and
   (b) a swizzle shank extending from and in the same plane as the other eyepiece whereby in a swizzle stick mode, the strip section functions as a long handle for the stick, the swizzle shank being connected to the strip section by a junction of reduced thickness so that in an ophthalmic device mode the shank may be broken off to transform the stick into an ophthalmic device.

2. A stick as set forth in claim 1, molded of a single piece of synthetic plastic material.

3. A stick as set forth in claim 1, wherein the junction is weakened by a score line.

4. A stick as set forth in claim 1, wherein said pattern is defined by parallel rows of equi-spaced pin holes in which the holes in one row are staggered with respect to those in the other row.

5. A stick as set forth in claim 1, wherein said handle is generally rectangular to form a sign board for advertising matter.

6. A stick as set forth in claim 1, in which the periphery of the strip is provided with a rigidifying ridge.

7. A stick as set forth in claim 1, in which one face of the strip is provided with reinforcing ribs in a criss-cross formation.

* * * * *